(No Model.)

C. DAVIDSON.
ROPE OR CABLE COUPLING.

No. 463,443. Patented Nov. 17, 1891.

Witnesses:
E. S. Ellis.
J. M. Nesbit

Inventor
Chas. Davidson
per
Lehmann & Pattison,
Attys.

THE NORRIS PETERS CO., PHOTO-LITHO., WASHINGTON, D. C.

UNITED STATES PATENT OFFICE.

CHARLES DAVIDSON, OF GUELPH, CANADA.

ROPE OR CABLE COUPLING.

SPECIFICATION forming part of Letters Patent No. 463,443, dated November 17, 1891.

Application filed October 14, 1890. Serial No. 368,147. (No model.)

*To all whom it may concern:*

Be it known that I, CHARLES DAVIDSON, of Guelph, in the county of Wellington and Province of Ontario, Canada, have invented certain new and useful Improvements in Rope or Cable Couplings; and I do hereby declare the following to be a full, clear, and exact description of the invention, such as will enable others skilled in the art in the art to which it pertains to make and use it, reference being had to the accompanying drawings, which form part of this specification.

My invention relates to an improvement in rope or cable couplings; and it consists in the combination of two couplings, one of which is provided with an eye and the other with a hook, and both of which are made hollow or tubular at those ends where they are secured to the rope or cable, split up their sides, and provided with internal serrations of teeth, with rivets for drawing the split sides tightly in contact with the ropes or cables, as will be more fully described hereinafter.

The object of my invention is to provide a means for quickly and easily connecting the ends of ropes or cables, whereby the length of the rope or cable can be quickly regulated either by taking lengths out or adding them together.

Figure 1:
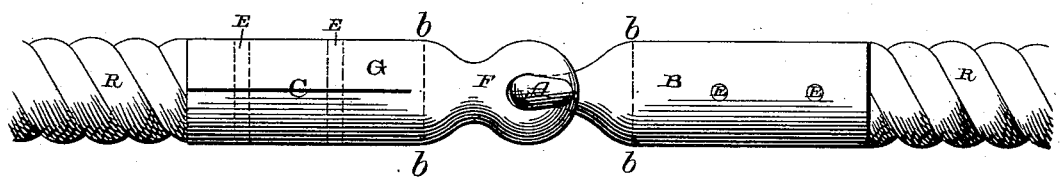
Figure 3:
Figure 2:
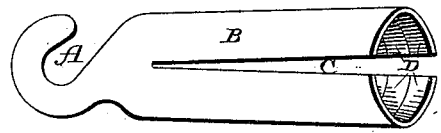
Figure 5:
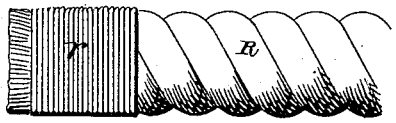
Figure 4:
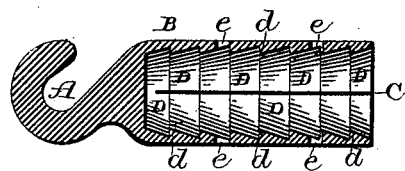

Figure 1 is a view of the coupling. Fig. 2 is a view of the hook. Fig. 3 is a view of the eye. Fig. 4 is a sectional view. Fig. 5 is a view of the end of a rope ready to receive the hook and eye.

The hook A is solid and formed integrally with a shank B, which is hollow or tubular from the point $b$, up to which point it is solid to give strength to the hook. A split C on opposite sides, forming jaws, is provided in order that the rope R may be inserted and after insertion closed tightly on the said rope. The interior surfaces of these jaws are provided with a series of annular serrations or teeth D, having square shoulders $d$, facing the solid part of the shank. Rivet-holes $e$ are provided for the reception of rivets E, which pass through the rope R, and close the jaws of the shank B and hold the rope securely.

The eye F, adapted to be engaged by the hook A, is made solid and integrally with the shank G, which is made hollow and similar in all respects to the shank B.

The ends of the rope R are whipped with copper wire $r$, or other suitable material, as shown in Fig. 5, and are then inserted in the shanks B and G and the rivets E, of which there may be one or more to each hook or eye, are driven in, thus drawing the jaws together, the rivets and the annular serrations making a secure joint between the rope and the hook or eye.

This invention bears no relation to and I do not herein claim bell-cord or cable couplings or couplings for uniting ship-rigging comprising sectional members clamped on the rope ends by exterior sleeves or like exterior devices or by internal wedges, as said devices cannot accomplish the object of my invention, nor can they be applied to the use for which my invention is intended.

My invention is a coupling for ropes or cables used for transmitting power and traveling over pulleys which are usually grooved. Hence the coupling is so constructed as not to be greater in diameter than the cable, so that the pulleys or couplings will not be injured, but yet so as to rigidly grasp the cable ends without danger of pulling off or raveling out said ends.

In applying the members of the couplings the cable ends are wrapped tightly with wire. The members are then placed on the ends, and the sides thereof pressed together by a vise, so that the interior annular teeth bite tightly into said wire wrapping, and then the rivets are passed through, thereby firmly and rigidly holding the sides or jaws of the coupling members together and in position.

I claim as my invention—

The herein-described coupling for traveling power-transmitting cables, consisting of two members, one provided with a hook and the other with an eye, each member formed integral with a solid end terminating in the hook or eye and having the tubular shank of substantially the same external diameter as the cable and split longitudinally on two sides, and having the internal transverse serrations formed to bite into the wire wrapping on the cable ends, and the pins passing through the opposite sides of the shank and the cable ends, as shown and set forth.

In testimony whereof I affix my signature in presence of two witnesses.

CHARLES DAVIDSON.

Witnesses:
 HENRY KITSON,
 ROBERT HOOSIE RODGER.